US012619199B2

(12) United States Patent
Yasuda

(10) Patent No.: US 12,619,199 B2
(45) Date of Patent: May 5, 2026

(54) CASE AND TIMEPIECE

(71) Applicant: CASIO COMPUTER CO., LTD., Tokyo (JP)

(72) Inventor: Takumi Yasuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 285 days.

(21) Appl. No.: 18/381,720

(22) Filed: Oct. 19, 2023

(65) Prior Publication Data

US 2024/0176302 A1 May 30, 2024

(30) Foreign Application Priority Data

Nov. 30, 2022 (JP) ................................ 2022-192481

(51) Int. Cl.
*G04B 37/00* (2006.01)
*G04B 45/00* (2006.01)

(52) U.S. Cl.
CPC ..... *G04B 37/0008* (2013.01); *G04B 45/0069* (2013.01)

(58) Field of Classification Search
CPC ............ G04B 37/0008; G04B 45/0069; G04B 37/005; G04B 43/002; G04G 17/08; G04G 17/083; G04G 17/02
See application file for complete search history.

(56) References Cited

U.S. PATENT DOCUMENTS

| | | | | |
|---|---|---|---|---|
| 8,500,325 B2 * | 8/2013 | Ueno | G04B 37/052 368/287 |
| 8,706,176 B1 | 4/2014 | Jia et al. | |
| 8,708,552 B2 * | 4/2014 | Ueno | G04G 17/08 368/286 |
| 10,599,102 B2 * | 3/2020 | Sawada | G04B 33/00 |
| 11,199,814 B2 | 12/2021 | Chen | |
| 11,199,816 B2 * | 12/2021 | Sano | G04G 21/04 |
| 2019/0368608 A1 | 12/2019 | Chen | |
| 2019/0369563 A1 | 12/2019 | Chen et al. | |

FOREIGN PATENT DOCUMENTS

| | | |
|---|---|---|
| GB | 191222414 A | 6/1913 |
| GB | 141316 A | 10/1920 |
| JP | H06294876 A | 10/1994 |

(Continued)

OTHER PUBLICATIONS

Extended European Search Report (EESR) dated Apr. 24, 2024, issued in counterpart European Application No. 23211637.6.

*Primary Examiner* — Edwin A. Leon
(74) *Attorney, Agent, or Firm* — Holtz, Holtz & Volek PC

(57) ABSTRACT

A case including a device case, and an exterior member which is attached covering an outer circumferential surface of an upper part of the device case, in which the device case has a catching portion formed in an outer circumferential portion thereof, the exterior member has an engaging portion which is formed on an inner side portion thereof, engages with the catching portion when the exterior member is attached to the device case, and prevents the exterior member from being detached from the device case, and a support area which supports the engaging portion of the exterior member is formed of a material whose hardness is lower than hardness of a material of an area adjacent to the support area.

17 Claims, 9 Drawing Sheets

(56) References Cited

FOREIGN PATENT DOCUMENTS

| | | | |
|---|---|---|---|
| JP | 2500516 | B2 | 5/1996 |
| JP | H11044775 | A | 2/1999 |
| JP | 2003004869 | A | 1/2003 |
| JP | 7080447 | B1 | 5/2022 |
| JP | 2022126244 | A | 8/2022 |

* cited by examiner

CASE AND TIMEPIECE

CROSS-REFERENCE TO RELATED APPLICATION

This application is based upon and claims the benefit of priority from the prior Japanese Patent Application No. 2022-192481, filed Nov. 30, 2022, the entire contents of which are incorporated herein by reference.

BACKGROUND OF THE INVENTION

1. Field of the Invention

The present invention relates to a case that is used for electronic devices such as wristwatches, and a timepiece having the case.

2. Description of the Related Art

For example, a wristwatch is known which has a structure where an exterior member is interchangeably attached to a case, as shown in Japanese Patent Application Laid-Open (Kokai) Publication No. H11-044775. In this structure, the exterior member includes a decorative section with decoration and fitting sections provided on peripheral edges of the decorative section so as to be arranged on the peripheral surface of the case.

SUMMARY OF THE INVENTION

One embodiment of the present invention is a case comprising: a device case; and an exterior member which is attached covering an outer circumferential surface of an upper part of the device case, wherein the device case has a catching portion formed in an outer circumferential portion thereof, wherein the exterior member has an engaging portion which is formed on an inner side portion thereof, engages with the catching portion when the exterior member is attached to the device case, and prevents the exterior member from being detached from the device case, and wherein a support area which supports the engaging portion of the exterior member is formed of a material whose hardness is lower than hardness of a material of an area adjacent to the support area.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

Figure 1:
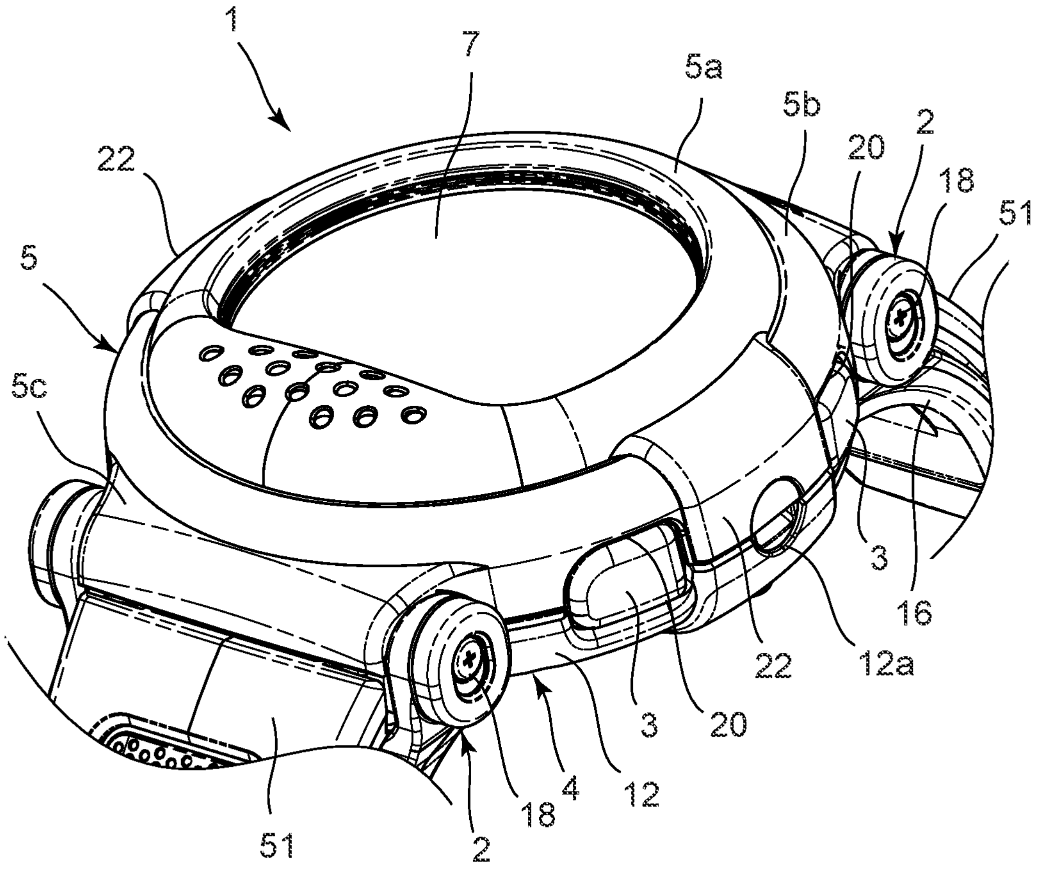
FIG. 1 is a perspective view of an embodiment in which the present invention has been applied in a wristwatch.

An embodiment in which the present invention has been applied in a wristwatch will hereinafter be described with reference to FIG. 1 to FIG. 9. Note that, although the embodiment described below is provided, with various technically preferable limitations in order to carry out the present invention, these limitations are not intended to limit the scope of the present invention to the embodiment and an example shown in the drawings.

This wristwatch has a wristwatch case 1, as shown in FIG. 1. On outer circumferential portions of the wristwatch case 1 on the twelve o'clock side and the six o'clock side, band attachment sections 2 to which watch bands 51 are attached are provided.

In addition, on outer circumferential portions of the wristwatch case 1 on the two o'clock side, the four o'clock side, the eight o'clock side, and the ten o'clock side, push button switches 3 are provided, as shown in FIG. 1 to FIG. 4. These push button switches 3 project from the outer circumferential surface of the wristwatch case 1, and are used for selecting and performing various types of functions such as a time correction function and a display function.

Figure 2:
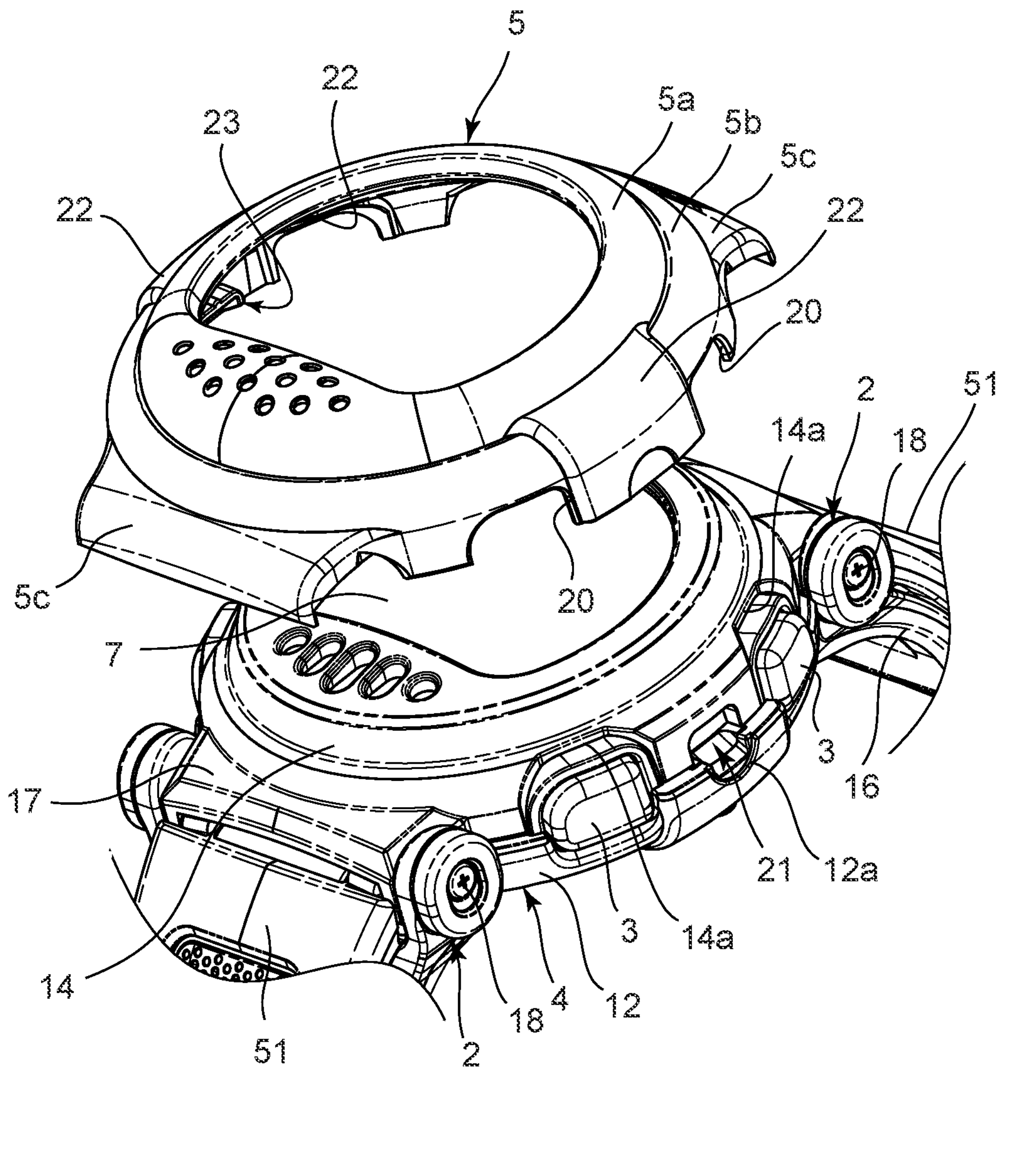
FIG. 2 is a perspective view of the wristwatch shown in FIG. 1, in which an exterior member has been detached therefrom.
Figure 3:
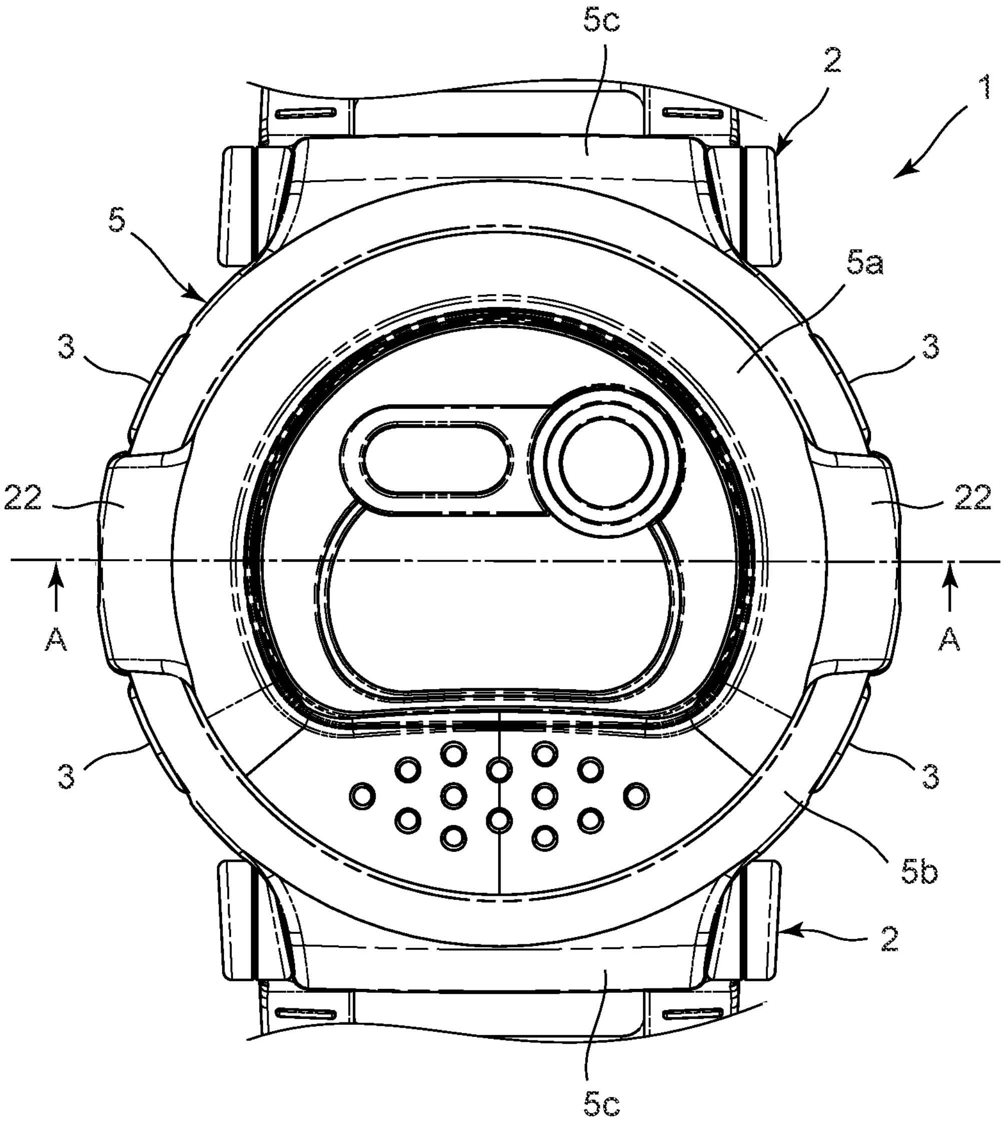
FIG. 3 is a front view of the wristwatch shown in FIG. 1.
Figure 4:
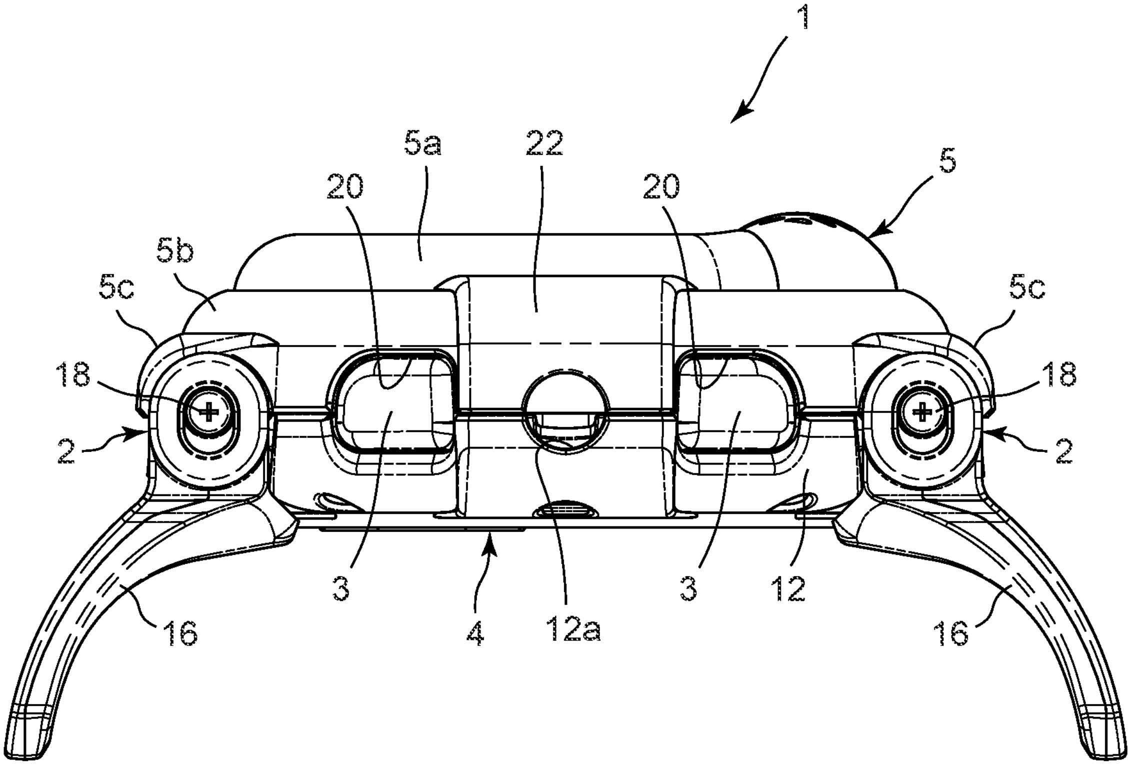
FIG. 4 is a left side view of the wristwatch shown in FIG. 1.

The wristwatch case 1 includes a device case 4 provided with the above-described push button switches 3, and an exterior member 5 which is attached to the upper part of the device case 4 while covering the upper surface thereof and the upper outer circumferential surface (the outer circumferential surface of the upper part) thereof and can be detached when necessary, as shown in FIG. 2, In two outer circumferential portions of the device case 4 on the three o'clock side and the nine o'clock side, later-described catching sections 21 for locking the exterior member 5 are formed.

Figure 5:
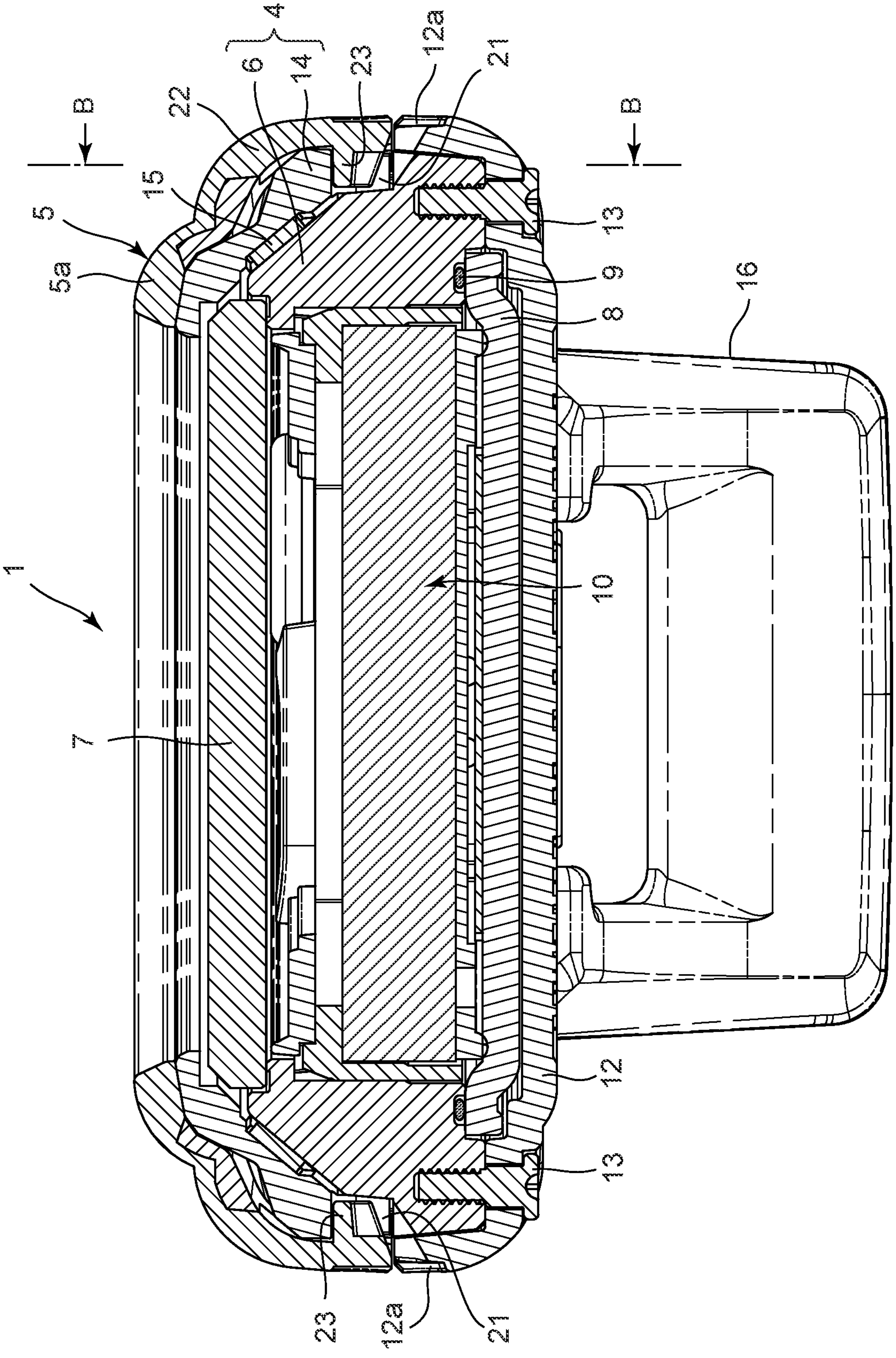
FIG. 5 is a cross-sectional view of the wristwatch taken along the A-A arrow view in FIG. 3.

The device case 4 includes a case main body 6 whose inner part is open in upward and downward directions, as shown in FIG. 5. The case main body 6 is made of metal such as stainless steel, and the above-described push button switches 3 are inserted from outside into through holes (not shown in the drawings) formed in this case main body 6. By spring members or elastic members such as urethane provided in the through holes, the push button switches 3 are forced to be at positions where their operation head sections protrude from the outer circumferential surface of the wristwatch case 1 while being prevented from slipping out of the case main body 6.

To the upper opening of the case main body 6, a watch glass 7 is attached. In addition, to the lower part of the case main body 6, a back cover 8 for covering the lower opening of the case main body 6 is attached via a waterproofing packing 9 by a plurality of screws not shown in the drawings. In the inner area of the case main body 6 covered by the watch glass 7 and the back cover 8, a timepiece module 10 is provided.

Although not shown in the drawings, the timepiece module 10 includes various types of components required to actualize timepiece functions, such as a timepiece movement which moves pointers to indicate the time, a display section which electro-optically displays information including time information, and a circuit section which electrically controls and drives these sections. The circuit section of the timepiece module 10 includes switching circuits which are mechanically turned on or off by the push button switches 3 being pushed.

Onto the lower side of the case main body 6, a back surface cover 12 is fitted and attached by a plurality of screws 13, This back surface cover 12 covers the back cover 8, and also covers about one-third of the outer circumferential surface of the case main body 6 in the thickness direction of the case main body 6 while exposing the push button switches 3.

Also, to the upper side of the case main body 6, a fixed exterior member 14 is attached via an annular buffering member 15. The fixed exterior member 14 covers the upper side of the outer circumferential surface of the case main body 6 and the whole circumferential part of the watch glass 7. In outer circumferential portions of the fixed exterior member 14 covering the outer circumferential surface of the case main body 6, a plurality of cutout sections 14*a* is formed in which the push button switches 3 protruding from the case main body 6 are housed from below when the fixed exterior member 14 is attached to the case main body 6. The back surface cover 12 and the fixed exterior member 14 are made of a hard synthetic resin. By being fixed to the case main body 6 via the buffering member 15, the fixed exterior member 14 is structured to buffer an impact that is exerted on the case main body 6 when the device case 4 receives an external impact.

Also, to outer circumferential portions of the case main body 6 on the twelve o'clock side and the six o'clock side, band supporting members 16 which project from the case main body 6 on the twelve o'clock side and the six o'clock side while being downwardly curved and support the watch bands 51 attached to the band attachment sections 2 from below, and attachment covers 17 which cover the upper surfaces of the base end sides of the band supporting members 16 are attached by screws 18 being inserted from the sides of each band attachment section 2 in the width directions, as shown in FIG. 1 to FIG. 5 and FIG. 7. Here, by these plural screws 18, the fixed exterior member 14 is also fixed to the case main body 6 together with the band supporting members 16 and the attachment covers 17.

Figure 6:
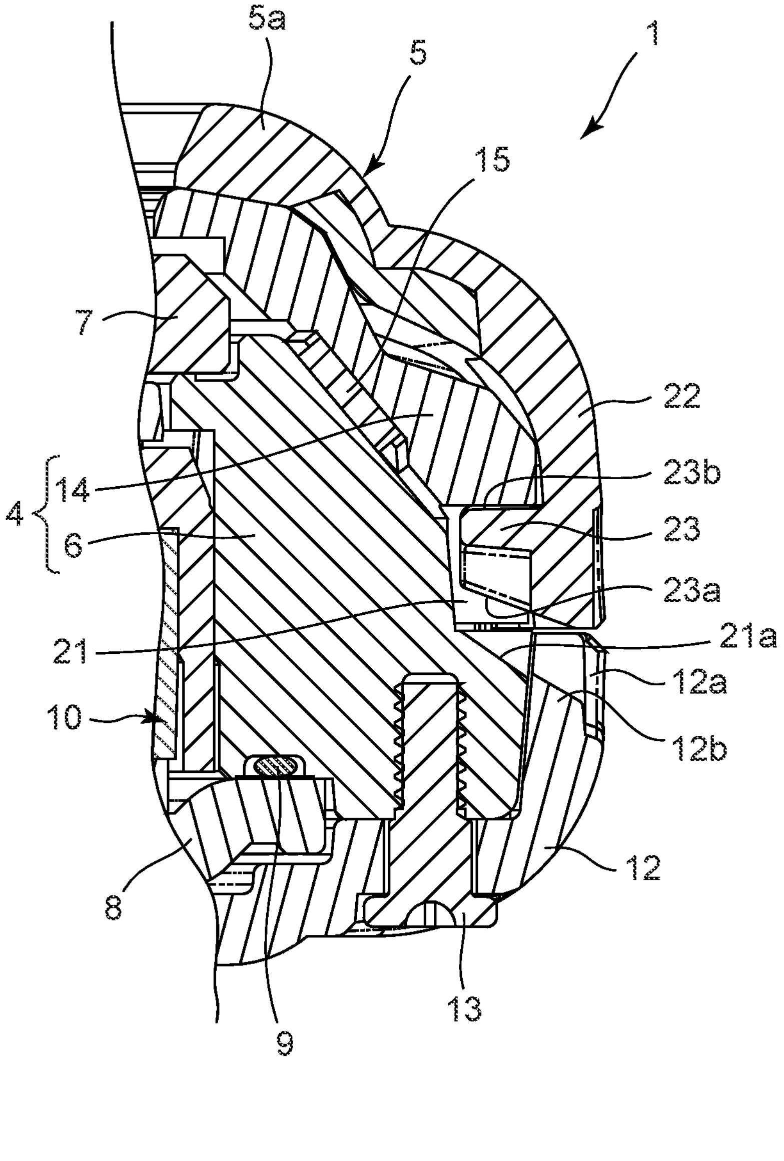
FIG. 6 is an enlarged cross-sectional view of a main portion shown in FIG. 5.

In the two outer circumferential portions of the device case 4 on the three o'clock side and the nine o'clock side, the catching sections 21 are formed as described above. These catching sections 21 are recess sections each of which is constituted by a cutout groove formed in an outer circumferential rim portion of the fixed exterior member 14 and a recess formed in an outer circumferential portion of the case main body 6 while opposing the cutout groove, and has a quadrilateral opening in the outer circumferential surface of the device case 4, as shown in FIG. 6. The bottom surface 21*a* of each catching section 21 formed by the case main body 6 is inclined such that the opening space of the catching section 21 is gradually enlarged toward the outer circumferential surface of the case main body 6 from the inner side. On the other hand, in outer circumferential portions of the back surface cover 12 covering the lower side of the case main body 6, cutout recess sections 12*a* which have semicircular shapes and are open upward are formed corresponding to the catching sections 21. On the inner circumference sides of these cutout recess sections 12*a* in the back surface cover 12, projection sections 12*b* are formed which have surfaces inclined to be flush with the undersurfaces 21*a* of the catching sections 21.

To the upper part of the device case 4, the exterior member 5 is attached covering the whole outer surface of the fixed exterior member 14. This exterior member 5 includes an upper side section 5*a* which is arranged on the upper surface of the fixed exterior member 14, an outer circumferential section 5*b* which is arranged on the outer circumferential surface of the fixed exterior member 14 around this upper surface, and cover sections 5*c* which are arranged on the upper surfaces of the attachment covers 17, as shown in FIG. 1 to FIG. 8.

In the outer circumferential section 5*b* of the exterior member 5, a plurality of cutout sections 20 is formed in which the push button switches 3 projecting from the device case 4 are housed from below when the exterior member 5 is attached to the device case 4. In addition, on the three o'clock side and nine o'clock side of the outer circumferential section 5*b* of the exterior member 5, attachment operation sections 22 are formed which cover the catching sections 21 of the device case 4, These attachment operation sections 22 have belt-like shapes and the surfaces of which project more outward than the outer circumferential section 5*b* of the exterior member 5.

On inner side portions of the exterior member 5, engaging sections 23 are formed which substantially orthogonally project from the back surfaces of the attachment operation sections 22 toward the inner side and are fitted into the catching sections 21 of the device case 4, as shown in FIG. 2 and FIG. 6 to FIG. 9. Here, details of the engaging sections 23 are described with reference to FIG. 9, Each engaging section 23 is a hollow projection which is open in its projecting direction and downward direction, and its cross-sectional shape in a vertical direction is an inverted U-shape whose leading end side and lower side are open.

The undersurface 23*a* of each engaging section 23 is inclined upward from its base end side, whereby the thickness of each engaging section 23 in the vertical direction decreases from the based end side toward the leading end side. Also, on the upper surface 23*b* of each engaging section 23, an upper surface side projecting ridge 24 is formed which has a semicircular cross-sectional shape, and is located at a middle point in a width direction while extending from the based end of the engaging section 23 toward the leading end thereof. Moreover, on the right and left side surfaces 23*c* of each engaging section 23, side-surface side projecting ridges 25 are formed which are thinner than the upper surface side projecting ridge 24, have semicircular cross-sectional shapes as with the upper surface side projecting ridge 24, and extend from the base end of the engaging section 23 toward the leading end thereof in parallel with the upper surface side projecting ridge 24.

On the other hand, the above-described sections of the exterior member 5 are integrally formed using two types of materials whose hardness varies from each other. In the present embodiment, these two types of materials are first urethane resin which is soft and whose hardness is Shore A95° to A97°, and second urethane resin which is hard and whose hardness is about Shore D64°, and these first and second urethane resins have different colors. In the exterior member 5, the outer circumferential section 5*b* which is arranged on the outer circumferential surface of the fixed exterior member 14, side sections 22*a* (refer to FIG. 8) of each attachment operation section 22 in a circumferential direction, and the cover sections 5*c* which are arranged on the upper surfaces of the attachment covers 17 are formed using the second urethane resin.

The upper side section 5*a* which is arranged on the upper surface of the fixed exterior member 14, and portions of the attachment operation sections 22 excluding the side sections 22*a* which support the engaging sections 23 and form part of the lower rim of the exterior member 5, that is, support areas TR (refer to FIG. 8) of the outer circumferential section 5*b* are formed using the first urethane resin. As a result, the exterior member 5 is structured such that the attachment operation sections 22 can be elastically deformed in directions away from each other. In addition, the attachment operation sections 22 possess elasticity which the outer circumferential section 5*b* excluding the support areas TR and formed of the second urethane resin does not possess and by which the engaging sections 23 are moved from positions where they are out of the catching sections 21 of the device case 4 to positions where they are engaged with (fitted into) the catching sections 21 along with their shape recovery from the above-described elastic deformation.

As such, the support areas TR of the outer circumferential section 5*b* of the exterior member 5, which support the engaging sections 23, are formed of the material whose hardness is lower than that of areas adjacent to the support areas TR of the outer circumferential section 5*b*.

Figure 7A:
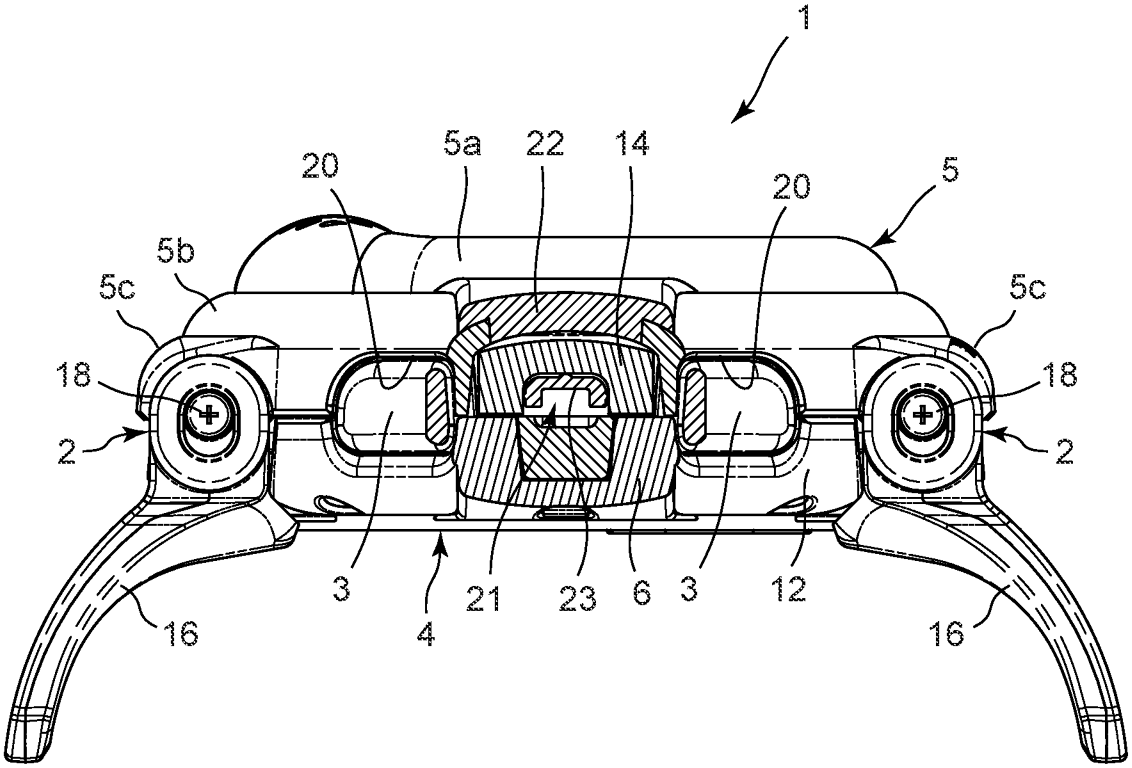
FIG. 7A is a partial cross-sectional view of the wristwatch taken along the B-B arrow view in FIG. 5.
Figure 7B:
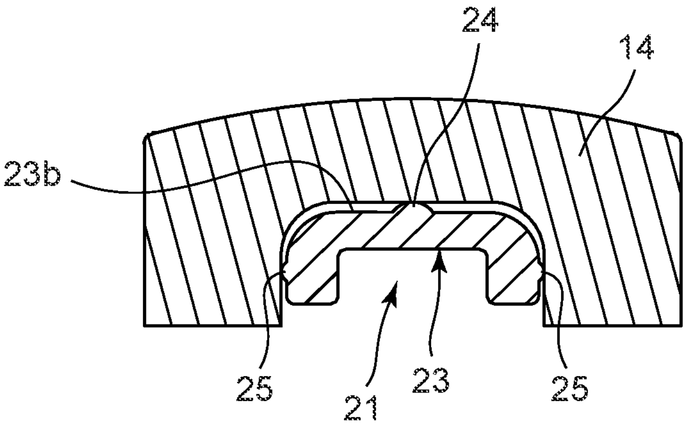
FIG. 7B is an enlarged cross-sectional view showing a relation between an fixed exterior member and an engaging section of the exterior member shown in FIG. 7A.
Figure 8:
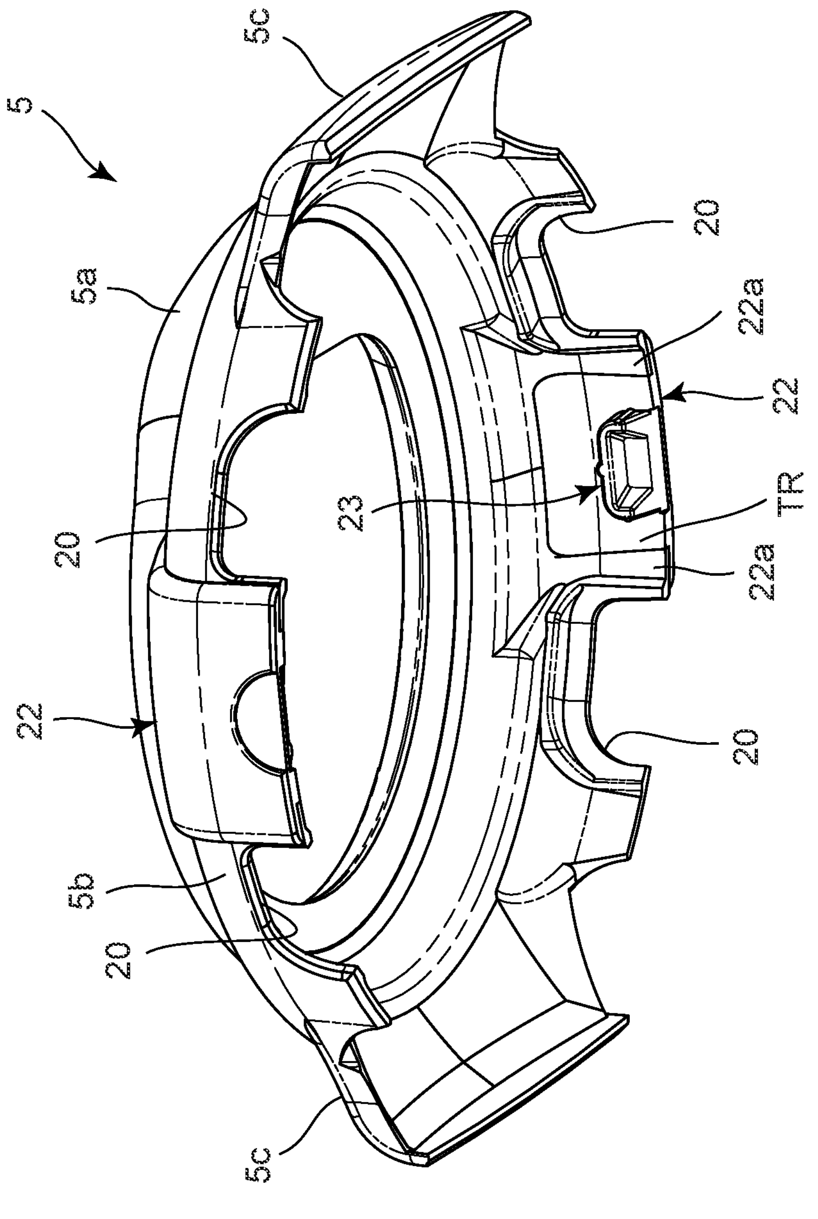
FIG. 8 is a perspective view of the exterior member.
Figure 9:
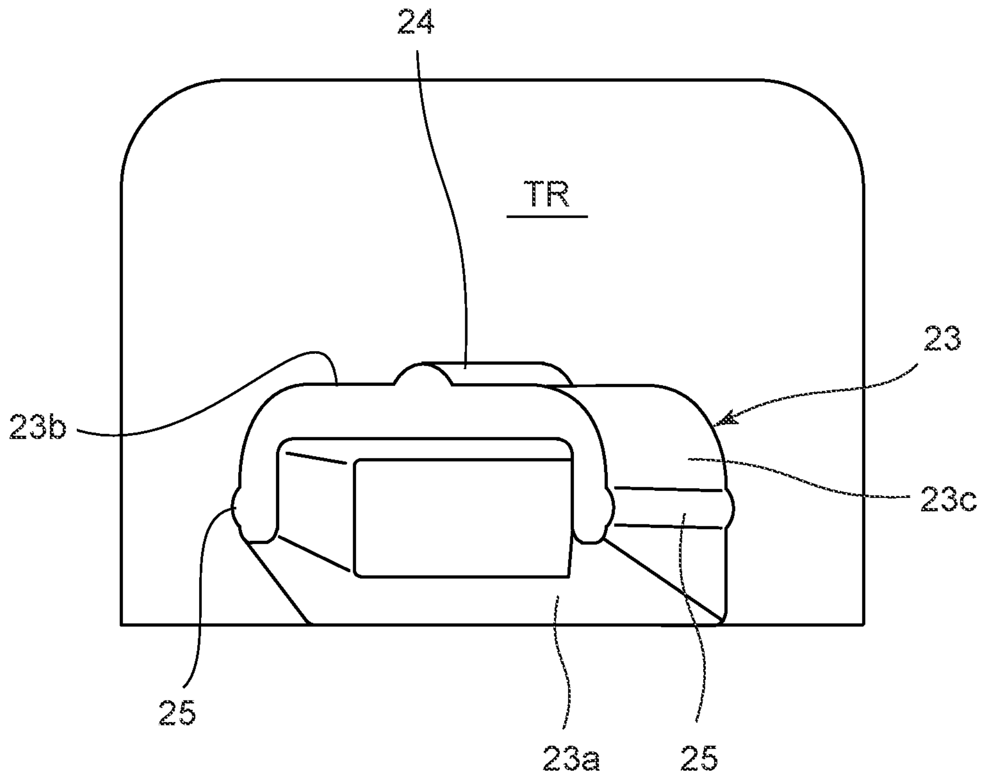
FIG. 9 is a perspective view showing the engaging section of the exterior member and a support area.

By the engaging sections 23 of the attachment operation sections 22 being fitted into and engaged with the catching sections 21, the exterior member 5 is prevented from slipping off the device case 4. In this state, the upper surface side projecting ridge 24 of each engaging section 23 is in pressure contact close to linear contact with the inner upper surface of the corresponding catching section 21, whereby there is a space between the upper surface 23*b* of each engaging section 23 and the inner upper surface of the corresponding catching section 21 by the presence of the upper surface side projecting ridges 24, as shown in FIG. 7B. Similarly, the side-surface side projecting ridges 25 of each engaging section 23 are in pressure contact close to linear contact with the side surfaces of the inner part of the corresponding catching section 21, whereby there are spaces between the side surfaces 23*c* of each engaging section 23 and the side surfaces of the inner part of the corresponding catching section 21 by the presence of the side-surface side projecting ridges 25.

Next, a step of detaching the exterior member 5 from the device case 4 of the wristwatch case 1 and a step of attaching the exterior member 5 to the device case 4 of the wristwatch case 1 in the present embodiment structured as described above are described. When the exterior member 5 is to be detached from the device case 4, first, a driver (not shown in the drawings) or a dedicated tool (not shown in the drawings) is inserted into one of the cutout recess sections 12*a* of the back surface cover 12 which is open toward the lower edge side of the corresponding attachment operation section 22 of the exterior member 5. Next, the lower end side of the attachment operation section 22 is elastically deformed outward by use of the driver or the dedicated tool, whereby the engaging section 23 provided on the back surface side of the attachment operation section 22 is disengaged from the corresponding catching section 21 of the device case 4. Then, in this state, the exterior member 5 is pulled upward such that the attachment operation section 22 is lifted. As a result, the exterior member 5 is detached from the device case 4.

Also, when the exterior member 5 detached from the device case 4 or an alternative exterior member 5 is to be attached to the device case 4, one of the engaging sections 23 of the attachment operation sections 22 is fitted into the corresponding catching section 21 of the device case 4 with the exterior member 5 being tilted. Next, the attachment operation section 22 on the other side is elastically deformed outward. In addition, the engaging section 23 on the back surface side of this attachment operation section 22 is brought into contact with the outer circumferential surface of the upper part of the device case 4 (fixed exterior member 14) and, in this state, the exterior member 5 is pressed against the device case 4. As a result, this attachment operation section 22 is elastically deformed further outward, and the engaging section 23 on the back surface side of the attachment operation section 22 is slid on the outer circumferential surface of the device case 4. Then, when the engaging section 23 reaches the opening of the corresponding catching section 21 of the device case 4, the attachment operation section 22 returns to its original shape, and the engaging section 23 is automatically fitted into the catching section 21 along with this return. As a result, the exterior member 5 is attached to the device case 4.

As described above, the wristwatch case 1 of the present embodiment includes the device case 4 and the exterior member 5 which is attached to and covers the outer circumferential surface of the upper part of the device case 4. In this wristwatch case 1, the catching sections 21 are formed in the outer circumferential part of the device case 4. In addition, the engaging sections 23 are formed on the inner part of the exterior member 5, which engage with the catching sections 21 when the exterior member 5 is attached to the device case 4, and prevent the exterior member 5 from being unintentionally detached from the device case 4. Moreover, the support areas TR (area around each engaging section 23) which support the engaging sections 23 of the exterior member 5 possess elasticity which the outer circumferential section 5*b* excluding the support areas TR does not possess and by which the engaging sections 23 are moved from positions where they are out of the catching sections 21 to positions where they are engaged with the catching sections 21 along with the shape recovery of the support areas TR.

As a result of this structure, by the support area TR of one of the attachment operation sections 22 which is part of the outer circumferential section 5*b* of the exterior member 5 being elastically deformed, the exterior member 5 can be easily attached to or detached from the device case 4. Also, since the outer circumferential section Sb excluding the support areas TR is formed of the hard material, the exterior member 5 is not deformed even if an external impact is exerted onto the outer circumferential section 5*b*, whereby the exterior member 5 is reliably prevented from being unintentionally detached from the device case 4.

In the case of the wristwatch described in Japanese Patent Application Laid-Open (Kokai) Publication No. H11-044775, there is a problem in that, due to the structure where the exterior member is attached to the case by the decorative section of the exterior member being arranged on the upper surface of the case and the fitting sections of the exterior member being fitted together with the circumferential surface of the case, the exterior member tends to come off the case when the fitting of the case and the exterior member is loose, or the case may be damaged when the fitting of the case and the exterior member is tight. In contrast, the wristwatch case 1 of the present embodiment does not have such a problem.

In the present embodiment, the catching sections 21 of the device case 4 are formed in the two portions of the outer circumferential part of the device case 4 on the three o'clock side and the nine o'clock side, that is, the two portions of the outer circumferential part of the device case 4 located across the center of the upper part of the device case 4 from each other, and the engaging sections 23 of the exterior member 5 are formed on the two inner side portions of the exterior member 5 corresponding to the catching sections 21. Therefore, the device case 4 can be reliably engaged with the exterior member 5 with workability in the attachment or detachment of the exterior member 5 being maintained.

Note that, in the implementation of the present invention, the catching sections 21 of the device case 4 may be formed also in other portions in addition to the above-described two portions of the device case 4, and the engaging sections 23 of the exterior member 5 may be formed also on other portions in addition to the above-described two portions of the exterior member 5. With this structure as well, the exterior member 5 can be easily attached to or detached from the device case 4 by the elastic deformation of the support areas TR of the attachment operation sections 22 each of which is part of the outer circumferential section 5*b* of the exterior member 5, In addition, by the portions of the outer circumferential section 5*b* other than the support areas TR being formed by the hard material, the exterior member 5 can be reliably prevented from being unintentionally detached from the device case 4.

Also, in the present embodiment, the catching sections 21 of the device case 4 and the engaging sections 23 of the exterior member 5 are formed in the two areas of the device case 4 and the exterior member 5 on the three o'clock side and the nine o'clock side. However, the present invention is not limited thereto and, for example, a structure may be adopted in which the catching sections 21 and the engaging sections 23 are formed in two areas on the twelve o'clock side and the six o'clock side. Note that, in the case of the structure of the present embodiment where the catching sections 21 and the engaging sections 23 are formed in the two areas on the three o'clock side and the nine o'clock side, the engaging sections 23 are more deeply fitted into the catching sections 21 as compared to the structure where they are formed on the twelve o'clock side and the six o'clock side.

In the present embodiment, the push button switches 3 (operation members) projecting from the outer circumferential surface of the device case 4 are located on the outer circumferential portions of the device case 4 on the two o'clock side, the four o'clock side, the eight o'clock side, and the ten o'clock side. On the other hand, the catching sections 21 of the device case 4 are formed in the two outer circumferential portions of the device case 4 on the three o'clock side and the nine o'clock side, that is, at positions shifted in a circumferential direction from the positions of the push button switches 3. In addition, the outer circumferential section 5*b* of the exterior member 5 attached to the device case 4 covers the outer circumferential surface of the upper part of the device case 4 while avoiding the push button switches 3. As a result of this structure, when the exterior member 5 is being attached to or detached from the device case 4, the push button switches 3 do not obstruct the exterior member 5, so that the exterior member 5 can be easily attached or detached. In addition, a situation can be avoided in which one or more of the push button switches 3 are unintentionally pushed by the exterior member 5 and time correction is unintentionally performed.

Also, in the present embodiment, the exterior member 5 is integrally formed by the first material (first urethane resin) which forms the support areas TR that support the engaging sections 23, and the second material (second urethane resin) whose hardness is higher than that of the first material and which forms the outer circumferential section 5*b* excluding the support areas TR, That is, the exterior member 5 is integrally formed by a first area (the upper side section 5*a* and the support areas TR of the outer circumferential section 5*b*) including the first material and a second area (both side sections 22*a* of each attachment operation section 22 in the circumferential direction and the cover sections 5*c*) including the second material harder than the first material. Accordingly, by the simple structure, the support areas TR possess elasticity which the outer circumferential section 5*b* excluding the support areas TR does not possess and by which the engaging sections 23 are moved from positions where they are out of the catching sections 21 to positions where they are engaged with the catching sections 21 along with the shape recovery of the support areas TR, whereby the cost reduction of the exterior member 5 is achieved.

In the present embodiment, the upper side section 5*a* of the exterior member 5 is formed using the material having the same hardness as that of the material of the support areas TR which support the engaging sections 23 on the outer circumferential section 5*b* of the exterior member 5. However, the upper side section 5*a* of the exterior member 5 may be formed using a material harder than the material of the support areas TR which support the engaging sections 23 on the outer circumferential section 5*b* of the exterior member 5.

Also, the material of the areas of the outer circumferential section 5*b* of the exterior member 5 other than the support areas TR is only required to have a hardness higher than that of the first material, and therefore its hardness may be less or greater than that of the second material (harder than the first material).

Moreover, the exterior member 5 is not necessarily required to be constituted by the first material and the second material, and may be constituted by first, second, and third materials. In that case, the support areas TR of the outer circumferential section Sb on the three o'clock side and the nine o'clock side are only required be formed of a material with the smallest hardness.

Since the areas of the outer circumferential section Sb of the exterior member 5 other than the support areas TR are formed of the material harder than that of the support areas TR, an advantageous effect is acquired in that the exterior member 5 is not easily detached from the fixed exterior member 14.

In the case of the wristwatch case 1, portions of the outer circumferential surface on the twelve o'clock-side and the six o'clock side can absorb impacts by the watch bands 51. Here, the wristwatch case 1 is thinner in a thickness direction than in a lateral direction, and therefore its upper surface is susceptible to impacts as compared to its side surface. However, since the upper side section 5*a* of the exterior member 5 is formed of the material whose hardness is lower than that of the material of the areas adjacent to each support area TR of the outer circumferential section 5*b* of the exterior member 5, impacts from above which may damage the crystal liquid and the module can be easily absorbed.

Also, in the present embodiment, the support areas TR of the outer circumferential section 5*b* of the exterior member and the other areas of the outer circumferential section 5*b* of the exterior member 5 are formed in colors different from each other by the colors of their urethane resins being differentiated. As a result of this structure, the design which cannot be acquired by a method where only surface shapes are differentiated is achieved for the exterior member 5. In addition, in the manufacture of the exterior member 5, a wide selection of designs can be achieved at low costs.

Moreover, in the present embodiment, the catching sections 21 of the device case 4 form recess sections in the outer surface of the outer circumferential part of the device case 4, and the engaging sections 23 of the exterior member 5 form projection sections which project from the inner surface of the outer circumferential section 5*b* and are fitted into the catching sections 21 from the outer circumference side of the device case 4. Accordingly, a high engaging strength is achieved between the catching sections 21 of the device case 4 and the engaging sections 23 of the exterior member 5.

Furthermore, in the present embodiment, on the upper surface 23*b* of each engaging section 23 of the exterior member 5, the projecting ridge (the upper surface side projecting ridge 24) is formed which extends from the base end of the engaging section 23 toward the leading end thereof and comes in pressure contact with the upper surface of the inner side of the corresponding catching section 21 of the device case 4 when the engaging section 23 is fitted into the catching section 21. Accordingly, when the engaging sections 23 are to be inserted into the catching sections 21 for the attachment of the exterior member 5, or when the exterior member 5 is to be detached, each engaging section 23 comes in pressure contact close to linear contact with the upper surface of the inner side of the corresponding catching section 21. That is, frictional resistance when the engaging sections 23 are inserted into the catching sections 21 can be reduced to less than that when the projecting ridge is not formed. As a result of this structure, the support areas TR which support the engaging sections 23 can be designed such that the elastic strength is low, Thus, in the present embodiment where the engaging sections 23 are formed using the material that forms the support areas TR, that is, the elastic material, workability when the exterior member 5 is attached or detached can be enhanced by the elastic strength of each support area TR being low Still further, in the present embodiment, each engaging section 23 of the exterior member 5 is a hollow projection which is open in its projecting direction and downward direction. Therefore, in this embodiment where the engaging sections 23 are formed by the material that forms the support areas TR, each engaging section 23 can be easily deformed when being inserted into the corresponding catching section 21 for the attachment of the exterior member 5, whereby the catching sections 21 can be favorably fitted together (engaged) with the engaging sections 23.

Yet still further, in the present embodiment, the device case 4 includes the case main body 6 and the fixed exterior member 14 which is harder than the support areas TR of the exterior member 5, provided with the catching sections 21, and fixed on the upper part of the case main body 6, and the exterior member 5 is attached to the device case 4 while covering the outer circumferential surface of the upper part of the fixed exterior member 14. As a result of this structure, even though the device case 4 is provided with the fixed exterior member 14, the exterior member 5 can be easily attached to or detached from the device case 4, and can be reliably prevented from being inadvertently detached from the device case 4.

In the structure of the present embodiment, the catching sections 21 which form recess sections are provided in the device case 4, and the engaging sections 23 which form projection sections corresponding to the recess sections are provided on the exterior member 5. However, a reverse structure may be adopted in which the engaging sections 23 are provided on the device case 4 and the catching sections 21 are provided in the exterior member 5.

Also, in the above-described embodiment, the present disclosure has been applied in a wristwatch. However, the present invention is not necessarily required to be applied in a wristwatch. For example, the present invention is applicable to various types of timepieces such as a travel watch, an alarm clock, a table clock, and a wall clock.

In addition, the present invention is not necessarily required to be applied in timepieces, and can be applied in various types of electronic devices such as cell-phones and portable information terminals.

While the present invention has been described with reference to the preferred embodiments, it is intended that the invention be not limited by any of the details of the description therein but includes all the embodiments which fall within the scope of the appended claims.

What is claimed is:

1. A case comprising:

a device case; and an exterior member which is attached covering an outer circumferential surface of an upper part of the device case, wherein the device case has a catching portion formed in an outer circumferential portion thereof, wherein the exterior member has an engaging portion which is formed on an inner side portion thereof, engages with the catching portion when the exterior member is attached to the device case, and prevents the exterior member from being detached from the device case, wherein a support area which supports the engaging portion of the exterior member is formed of a material whose hardness is lower than hardness of a material of an area adjacent to the support area, and wherein the exterior member includes the support area and the area adjacent to the support area, which are formed as an integrated member.

2. The case according to claim 1, wherein areas other than the support area of the exterior member are formed of a material whose hardness is higher than the hardness of the material of the support area.

3. The case according to claim 1, wherein an upper side portion of the exterior member is formed of a material whose hardness is lower than the hardness of the material of the area adjacent to the support area of the exterior member.

4. The case according to claim 3, wherein the hardness of the material of the upper side portion of the exterior member is equal to the hardness of the material of the support area.

5. The case according to claim 1, wherein the support area which supports the engaging portion of the exterior member possesses elasticity by which the engaging portion is moved from a position where the engaging portion is out of the catching portion to a position where the engaging portion is engaged with the catching portion along with shape recovery of the support area.

6. The case according to claim 1, wherein the catching portion is plurally formed in two symmetrical portions of an outer circumferential part of the device case located across a center of an upper part of the device case from each other, and wherein the engaging portion of the exterior member is plurally formed on two inner side portions of the exterior member corresponding to the catching portions.

7. The case according to claim 1, wherein an operation member projects from an outer circumferential surface of the device case, and the catching portion is formed at a position shifted in a circumferential direction from a position of the operation member on the outer circumferential surface, and wherein the exterior member attached to the device case covers the outer circumferential surface of the upper part of the device case while avoiding the operation member.

8. The case according to claim 1, wherein the exterior member is integrally formed by a first area including a first material and a second area including a second material whose hardness is higher than a hardness of the first material.

9. The case according to claim 1, wherein the support area of the exterior member and an area of the exterior member other than the support area differ from each other in color.

10. The case according to claim 1, wherein the catching portion of the device case forms a recess portion in an outer surface of an outer circumferential part of the device case, and wherein the engaging portion of the exterior member forms a projection portion which projects from an inner surface of the exterior member and is fitted into the catching portion from an outer circumference side of the device case.

11. The case according to claim 10, wherein an upper surface of the engaging portion of the exterior member is provided with a projecting ridge which extends from a base end of the engaging portion toward a leading end thereof and comes in pressure contact with an upper surface of an inner side of the catching portion of the device case when the engaging portion is fitted into the catching portion.

12. The case according to claim 10, wherein the projection portion formed by the engaging portion of the exterior member is a hollow projection which is open in a projecting direction and a downward direction.

13. The case according to claim 1, wherein the device case includes a case main body and a fixed exterior member which is harder than the support area of the exterior member, provided with the catching portion, and fixed on an upper part of the case main body, and wherein the exterior member is attached to the device case while covering an outer circumferential surface of an upper part of the fixed exterior member.

14. A timepiece comprising:

the case according to claim 1;

a pointer; and a movement which moves the pointer to indicate clock time.

15. The case according to claim 1, wherein the exterior member includes an attachment operation section that is integrally formed with the exterior member and that is provided at an outer circumferential portion of the exterior member, and wherein the attachment operation section includes the engaging portion.

16. The case according to claim 15, wherein the attachment operation section includes (i) the support area, which is provided adjacent to the engaging portion and supports the engaging portion, and (ii) side sections adjacent to the support area, the support area being interposed between the engaging portion and the side sections.

17. The case according to claim 16, wherein a hardness of a material of the support area is lower than a hardness of a material of the side sections.

* * * * *